(12) United States Patent
Yamashita (10) Patent No.: US 9,630,777 B2
(45) Date of Patent: Apr. 25, 2017

(54) MULTI-TIER AUTOMATED WAREHOUSE

(75) Inventor: Shin Yamashita, Obertshausen (DE)

(73) Assignee: Dematic Systems GmbH, Heusenstamm (DE)

( * ) Notice: Subject to any disclaimer, the term of this patent is extended or adjusted under 35 U.S.C. 154(b) by 591 days.

(21) Appl. No.: 14/124,732

(22) PCT Filed: Sep. 28, 2011

(86) PCT No.: PCT/JP2011/072277
§ 371 (c)(1),
(2), (4) Date: Dec. 9, 2013

(87) PCT Pub. No.: WO2013/046379
PCT Pub. Date: Apr. 4, 2013

(65) Prior Publication Data
US 2014/0124462 A1    May 8, 2014

(51) Int. Cl.
*B65G 1/04* (2006.01)
*B65G 1/137* (2006.01)

(52) U.S. Cl.
CPC ......... *B65G 1/1375* (2013.01); *B65G 1/0414* (2013.01); *B65G 1/0485* (2013.01); *B65G 1/0492* (2013.01); *B65G 1/1378* (2013.01)

(58) Field of Classification Search
CPC ... B65G 1/1378; B65G 1/0414; B65G 1/0492
(Continued)

(56) References Cited

U.S. PATENT DOCUMENTS 3,800,963 A * 4/1974 Holland .................. B65G 1/065
191/12.2 R
5,286,157 A    2/1994 Vainio et al.
(Continued)

FOREIGN PATENT DOCUMENTS

DE    102009032406 A1    1/2011
EP       2327643 A1    6/2011
(Continued)

OTHER PUBLICATIONS

Commonly assigned co-pending U.S. Appl. No. 14/244,362, filed Apr. 3, 2014.
(Continued)

*Primary Examiner* — Michael McCullough
*Assistant Examiner* — Ashley Romano
(74) *Attorney, Agent, or Firm* — Gardner, Linn, Burkhart & Flory, LLP (57) ABSTRACT

A multi-tier automated warehouse includes first and second stacking racks having multiple tiers of shelves and being positioned facing one another in parallel; loading shuttles which are capable of horizontal travel between the stacking racks, and which carry out loading and unloading of cargo upon the shelves; and an elevator device for moving the loading shuttles to different tiers. The elevator device further includes masts which are positioned adjacent to the stacking racks; a shuttle elevator platform, which is positioned elevatably on the inner side of the masts, for elevating the loading shuttles; and cargo elevator platforms, which are positioned elevatably on the outer side of the masts, for elevating the cargo. In a state where the shuttle elevator platform is aligned with the cargo elevator platforms, it is possible for the loading shuttles on the shuttle elevator platforms to carry out cargo loading and unloading to the cargo elevator platforms, allowing handling cargo even while the loading shuttles are being elevated, obviating the need for wasteful waiting for cargo. As a result, it is possible to implement high performance.

10 Claims, 6 Drawing Sheets

(58) Field of Classification Search
USPC .................................. 414/277, 278, 279, 280
See application file for complete search history.

(56) References Cited

U.S. PATENT DOCUMENTS

| | | | |
|---|---|---|---|
| 6,824,345 B2 | 11/2004 | Hansl et al. | |
| 7,261,509 B2* | 8/2007 | Freudelsperger | B65G 1/1378 414/269 |
| 8,146,729 B1 | 4/2012 | Wagner et al. | |
| 8,260,454 B2* | 9/2012 | Checketts | G06Q 10/06 414/234 |
| 8,876,454 B2* | 11/2014 | Koholka | B65G 1/1378 414/277 |
| 2002/0070099 A1 | 6/2002 | Neely | |
| 2004/0131451 A1 | 7/2004 | Winkler | |
| 2004/0228710 A1* | 11/2004 | Ueda | B65G 1/0421 414/279 |
| 2006/0051190 A1* | 3/2006 | Taguchi | B65G 1/0421 414/279 |
| 2006/0285948 A1* | 12/2006 | Tsujimoto | B65G 1/06 414/279 |
| 2011/0008137 A1 | 1/2011 | Yamashita | |
| 2011/0262253 A1* | 10/2011 | Krizmanic | B60L 11/1811 414/279 |
| 2012/0177465 A1* | 7/2012 | Koholka | B65G 1/0492 414/279 |
| 2012/0328397 A1 | 12/2012 | Yamashita | |

FOREIGN PATENT DOCUMENTS

| | | |
|---|---|---|
| EP | 1964792 B1 | 4/2012 |
| JP | 04-68014 H | 6/1992 |
| JP | 2004260511 A | 9/1992 |
| JP | 2007277412 A | 10/1995 |
| JP | 08175620 A | 7/1996 |
| JP | H08324721 A | 12/1996 |
| JP | 11278607 A | 10/1999 |
| JP | 2001-010704 A | 1/2001 |
| JP | 2002114324 A | 4/2002 |
| JP | 2004123240 A | 4/2004 |
| JP | 2009084006 A | 4/2009 |
| JP | 2011178549 A | 9/2011 |
| WO | 2010-026633 A1 | 3/2010 |

OTHER PUBLICATIONS

English Translation of International Search Report and Written Opinion of the International Searching Authority from corresponding Patent Cooperation Treaty (PCT) Application No. PCT/JP2011/072277, mailed Jun. 26, 2012.

* cited by examiner

MULTI-TIER AUTOMATED WAREHOUSE

CROSS REFERENCE TO RELATED APPLICATION

The present application claims the priority benefits of International Patent Application No. PCT/JP2011/072277, filed on Sep. 28, 2011, which is hereby incorporated herein by reference in its entirety.

TECHNICAL FIELD

The present invention relates to a highly-functional and flexible automated storage/retrieval system that includes at least one pair of multi-tier racks arranged parallel to each other and a transferring shuttle running horizontally between these multi-tier racks to store a load to or retrieve a load from the multi-tier racks.

BACKGROUND ART

As the above type of automated storage/retrieval system, for example, the automated storage/retrieval system described in Japanese Patent Application Publication No. JPH08-324721 is well-known. The automated storage/retrieval system described in JPH08-324721 includes at least one pair of left and right multi-tier racks, each being composed of multi-tier shelves. Between these multi-tier racks are provided a transferring shuttle that can run in a horizontal direction. The transferring shuttle is for storing a load to or retrieving a load from the left or right multi-tier racks.

The automated storage/retrieval system described in such Japanese patent application publication is referred to as a captive-type automated storage/retrieval system since one transferring shuttle is exclusively provided for each tier of the multi-tier racks. This captive-type automated storage/retrieval system is highly efficient, but the increase of the number of tiers of the multi-tier racks increases the number of expensive transferring shuttles and the number of waiting transfer shuttles thereof, which in turn increases the whole cost of the automated storage/retrieval system.

Then, conventionally, as described in Japanese Patent Application Publication No. 11-278607, an automated storage/retrieval system is known in which an elevator to move a transferring shuttle upward and downward is disposed adjacent to a multi-tier rack. That is, by using the elevator to move the transferring shuttle to another tier, the number of transferring shuttles can be made to be less than the number of tiers of the multi-tier racks. Such an automated storage/retrieval system is referred to as a roaming-type automated storage/retrieval system since the transferring shuttle can move to any tier of the multi-tier racks.

SUMMARY OF THE INVENTION

In the above conventional roaming-type automated storage/retrieval system, reduction of the number of transferring shuttles can reduce the whole cost of the system, but there is the problem that lifting movement of the transferring shuttle takes time, thereby limiting the throughput performance of the system.

Accordingly, the present invention provides a roaming-type automated storage/retrieval system that has an advantage of lower cost and a high throughput performance.

An automated storage/retrieval system according to a first aspect of the present invention includes a first multi-tier rack and a second multi-tier rack arranged parallel to each other, each having shelves; a transferring shuttle that can run in a horizontal direction along a shelf of a selected tier between the first and second multi-tier racks to store a load onto and retrieve a load from the shelf; and an elevator for moving a transferring shuttle to another tier, wherein the elevator includes a shuttle elevating platform for lifting movement with a transferring shuttle placed thereon, the shuttle elevating platform being able to move upward and downward adjacent to the first and second multi-tier racks, and a first load elevating platform and a second load elevating platform for lifting movement with a load placed thereon, respectively. The first and second load elevating platforms are able to move upward and downward together with the shuttle elevating platform while being horizontally in alignment with the shuttle elevating platform. When the shuttle elevating platform is in alignment with the first load elevating platform, a transferring shuttle on the shuttle elevating platform can deliver a load to or receive a load from the first load elevating platform, and when the shuttle elevating platform is in alignment with the second load elevating platform, a transferring shuttle on the shuttle elevating platform can deliver a load to or receive a load from the second load elevating platform.

In such a configuration, the shuttle elevating platform and the first load elevating platform and/or second load elevating platform can move upward and downward in alignment with each other, and during the lifting movement, a load can be delivered between the load elevating platform and the shuttle elevating platform. Accordingly, during the lifting movement of the transferring shuttle, it is not necessary to have a load wait on the transferring shuttle, thus contributing to improvement of the throughput performance of the automated storage/retrieval system.

The first load elevating platform and second load elevating platform may be fixed to the shuttle elevating platform in alignment with each other to move upward and downward together with the shuttle elevating platform, or the shuttle elevating platform, first load elevating platform and second load elevating platform may move upward and downward independently from one another.

The load elevating platform may include a conveyor that can convey a load thereon. This enables the load elevating platform to deliver a load to or receive a load from a storage conveyor and a retrieval conveyor of a conveying system outside the automated storage/retrieval system.

If higher throughput performance is needed, a waiting platform to place a load for waiting may be disposed on at least part of the tiers of the first multi-tier rack and second multi-tier rack, allowing for delivery of the load between this waiting platform and the first load elevating platform and second load elevating platform. In the area where the waiting platform is disposed, only loads can be delivered on the tiers with the waiting platform, as with a captive-type automated storage/retrieval system, further improving the throughput performance of the system.

The waiting platform may include a conveyor that can convey a load thereon in order to smoothly deliver a load to or receive a load from the load elevating platforms.

Instead of providing a conveyor on the waiting platform, the load elevating platform may include a handling mechanism that pushes a load onto the waiting platform or pulls a load from the waiting platform.

Each of the shelves may include a frame to fix auxiliary equipment, and the waiting platform may be fixed to this frame. This allows for easy change from the roaming-type to the captive-type or easy change from the roaming-type to a hybrid-type of the roaming-type and captive-type.

In the automated storage/retrieval system according to the present invention as described above, the shuttle elevating platform and load elevating platform can move upward and downward in alignment with each other. Accordingly, by performing handover of a load between the load elevating platform and the shuttle elevating platform while a transferring shuttle is moving upward and downward, the transferring shuttle does not need to have a load wait thereon. This can improve the throughput performance of the automated storage/retrieval system even if the system is the roaming-type. In addition, the automated storage/retrieval system according to the present invention can reduce an occupied time of the transferring shuttle on operation, which can reduce the number of transferring shuttles, exhibiting the roaming-type's inherent effect, that is, an advantageous effect in cost.

These and other objects, advantages and features of this invention will become apparent upon review of the following specification in conjunction with the drawings.

DESCRIPTION OF THE PREFERRED EMBODIMENT

Now, preferred embodiments of the present invention will be described with reference to the drawings. In the drawings, identical or corresponding parts have the same reference numbers.

Figure 1:
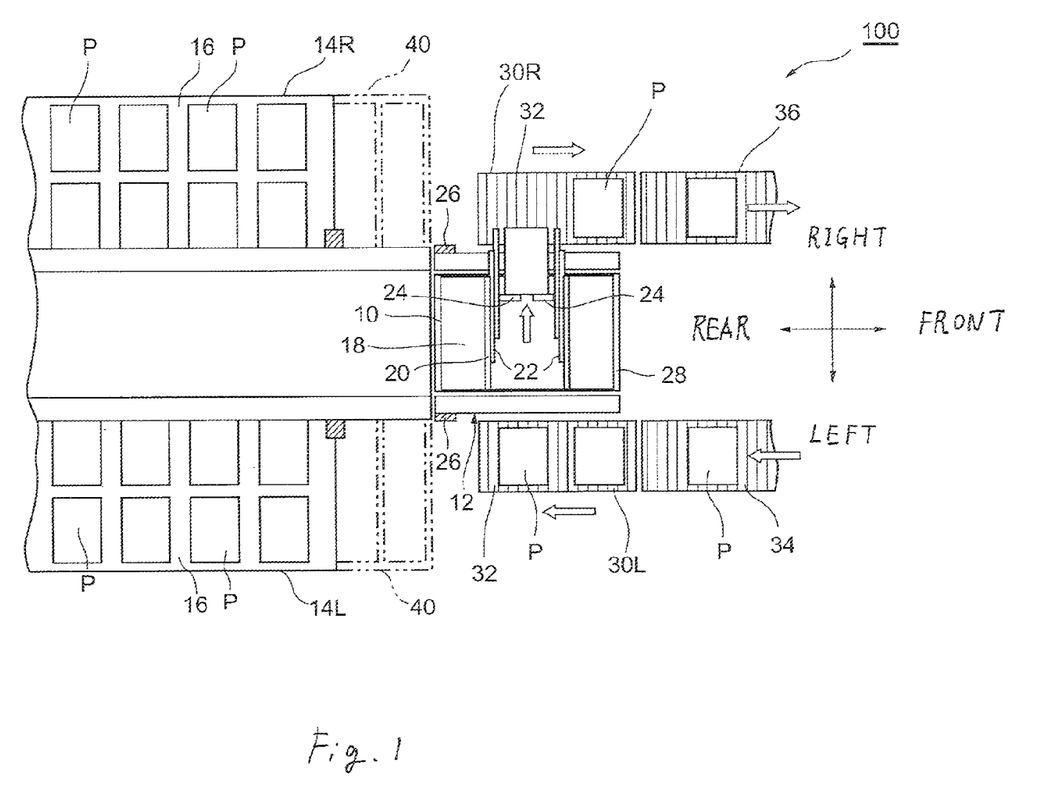
FIG. 1 is a schematic top plan view illustrating an automated storage/retrieval system according to a first embodiment of the present invention.

FIG. 1 is a schematic plane view illustrating an automated storage/retrieval system 100. This automated storage/retrieval system 100 is the roaming-type and includes an elevator 12 for moving the transferring shuttle 10 upward and downward.

Specifically, this automated storage/retrieval system 100 includes at least one pair of left and right pair multi-tier racks 14L, 14R, as illustrated. Each of the multi-tier racks 14L, 14R has shelves 16 extending in the same horizontal direction (front-back direction in FIG. 1). The pair of multi-tier racks 14L, 14R are arranged parallel to each other in a predetermined space apart from each other. The left multi-tier rack 14L corresponds to the first multi-tier rack in the claims, and the right multi-tier rack 14R corresponds to the second multi-tier rack in the claims.

Between these multi-tier racks 14L, 14R are disposed guide rails (not illustrated), at each tier, parallel to each other in the direction in which the shelves 16 extend; and the transferring shuttles 10 can run along these guide rails. The transferring shuttle 10 is for storing a load P onto and retrieving a load P from the left and right multi-tier racks 14L, 14R, and can be a conventional-type transferring shuttle. That is, the transferring shuttle 10 (not specifically illustrated in detail) is composed of a travelling cart 18 that can place a load P on the center portion thereof, and a handling mechanism 20 that is provided in the travelling cart 18 and is for pushing the placed load P rightward or leftward and pulling the load P from outside of the travelling cart 18. This handling mechanism 20 includes a pair of arms 22 that extend both leftward and rightward in a horizontal direction (left-right direction in FIG. 1) orthogonal to the running direction of the transferring shuttle 10, and fingers 24 that can open and close which are fixed to each of the arms 22. By extending the arm 22 either leftward or rightward with the fingers 24 closed, the load P placed on the center portion of the transferring shuttle 10 can be pushed out, enabling the load P to be stored onto a shelf 16 that is on the same height level as that of the surface of the center portion of the travelling cart 18 in the transferring shuttle 10. By extending the arm 22 onto the shelf 16 with the fingers 24 open, hooking the load P with the fingers 24 and retracting the arm 22 with the fingers 24 closed, the load P can be collected onto the transferring shuttle 10.

Since this automated storage/retrieval system 100 is the roaming-type, a transferring shuttle 10 is disposed at some tiers, but not all tiers, and the number of transferring shuttles 10 is set to be less than the number of tiers of multi-tier racks 14L, 14R. A transferring shuttle 10 is moved, between tiers, by the elevator 12 disposed to one end of the left and right multi-tier racks 14L, 14R.

The elevator 12 is composed of masts 26 disposed at an area adjacent to the space between the left and right multi-tier racks 14L, 14R; a shuttle elevating platform 28 that can move upward and downward between these masts 26; and a drive motor (not illustrated) for shuttle elevating platform 28. The shuttle elevating platform 28 includes guide rails that can connect to the guide rail of each tier. Accordingly, by moving the shuttle elevating platform 28 up or down to dispose at a height of a desired tier, the transferring shuttle 10 at the tier can be pulled onto the shuttle elevating platform 28. Then, by moving the shuttle elevating platform 28 with the transferring shuttle 10 placed thereon to another tier, the transferring shuttle 10 can be put onto a guide rail in the tier.

By moving the shuttle elevating platform 28 to the lowest position, the transferring shuttle 10 can be retrieved onto the building floor in which the automated storage/retrieval system 100 is installed. This enables the transferring shuttle 10 to be retrieved from the system without a special crane or the like so that the maintenance work for the shuttle 10 can be performed outside the system.

In the automated storage/retrieval system 100 according to the present embodiment, both of the outer left and right sides of the masts 26 of the elevator 12 are further provided with load elevating platforms 30L, 30R for moving a load P upward and downward, respectively. In the present embodiment, these load elevating platforms 30L, 30R are coupled to the shuttle elevating platform 28 in a horizontal alignment with each other, and travels, that is, moves upward and downward together with the shuttle elevating platform 28. These load elevating platforms 30L, 30R can deliver a load P onto and receive the load P from the transferring shuttle 10 on the shuttle elevating platform 28. The left load elevating platform 30L corresponds to a first load elevating platform and the right load elevating platform 30R corresponds to a second load elevating platform. These load elevating platforms 30L, 30R and the shuttle elevating platform 28 may be configured to move upward and downward independently from one another. In such a case, each of the load elevating platforms 30L, 30R will have a drive motor.

The load elevating platforms 30L, 30R, each includes a conveyor 32 so as to convey the load P in a parallel direction with the running direction of the transferring shuttle 10. Various types can be considered for the type of conveyor 32, but a roller conveyor is preferable so as to perform delivery of the load P in a direction orthogonal to the conveying direction of the conveyor 32.

As for the conveying direction of the conveyor 32, that of the left conveyor 32 is a direction that approaches the multi-tier rack 14L, and that of the right conveyor 32 is a direction that moves away from the multi-tier rack 14R, in the illustrated embodiment, but it is preferable that these directions can be reversed.

Each of the load elevating platforms 30L, 30R preferably carries more than one piece of loads P placed thereon and in the illustrated embodiment two pieces of loads P can be placed next to each other along the conveying direction, but each of the load elevating platforms 30L, 30R may also be configured to be able to carry only one load P placed thereon.

Further, to each of the load elevating platforms 30L, 30R can be connected a storage conveyor 34 and a retrieval conveyor 36 extending from the conveying system outside the automated storage/retrieval system 100. The storage conveyor 34 and retrieval conveyor 36 are disposed at a suitable height level, and in FIG. 2 both of the storage conveyor 34 and retrieval conveyor 36 are at the same height level as that of the lowest tiers of the multi-tier racks 14L, 14R. When the left load elevating platform 30L is at the same height level as that of the lowest tiers of the multi-tier racks 14L, 14R, the exit end of the storage conveyor 34 is aligned with the load elevating platform 30L, thus enabling the load P from the storage conveyor 34 to be placed onto the load elevating platform 30L. Similarly, when the right load elevating platform 30R is at the same height level as that of the lowest tiers of the multi-tier racks 14L, 14R, the entrance end of the retrieval conveyor 36 is aligned with the load elevating platform 30R, thus enabling the load P to be moved from the load elevating platform 30R to the retrieval conveyor 36.

Figure 2:
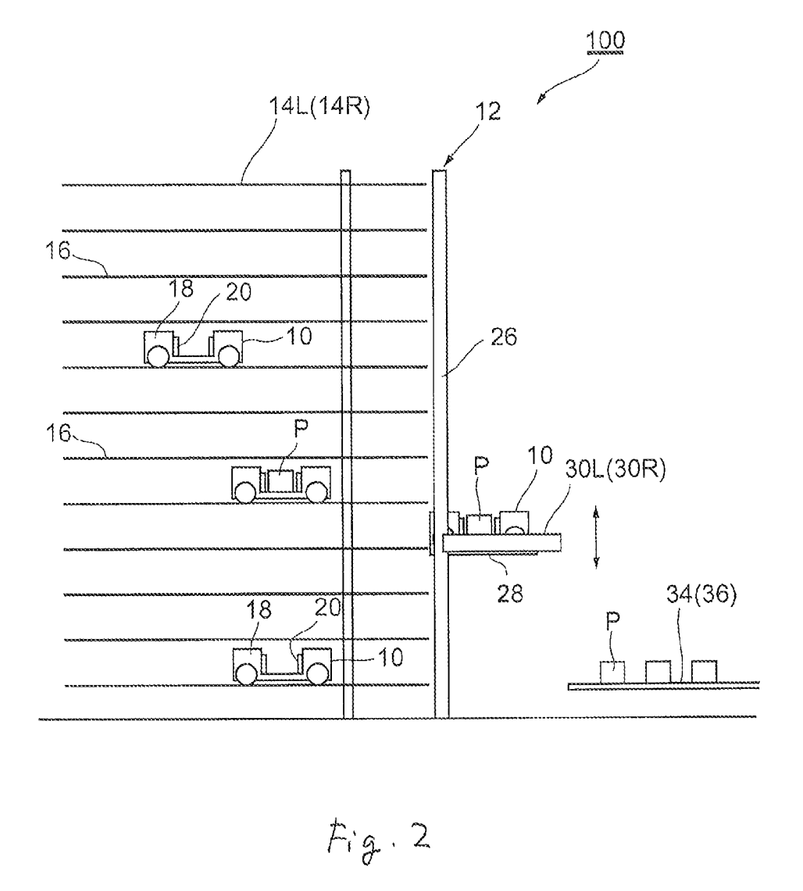
FIG. 2 is a schematic side elevation view of the automated storage/retrieval system in FIG. 1.

It should be appreciated that in the automated storage/retrieval system 100 having the above configuration, since the shuttle elevating platform 28 and load elevating platforms 30L, 30R operate integrally, the load P on the transferring shuttle 10 can be placed onto the load elevating platform 30R and the load P on the load elevating platform 30L can be placed onto the transferring shuttle 10 during the movement of the transferring shuttle 10.

For example, a case where the following three operations are performed will be described: (1) retrieving a load P on the fifth shelves 16 of the multi-tier racks 14L, 14R onto the retrieval conveyor 36, (2) storing a load P from the storage conveyor 34 onto the tenth shelves of the multi-tier racks 14L, 14R, and (3) moving a transferring shuttle 10 on the fifth tier to the tenth tier of the multi-tier racks 14L, 14R. First, a transferring shuttle 10 on the fifth tier is operated to move in front of the load P to be retrieved, and the load P is retrieved by the handling mechanism 20. During this time, the shuttle elevating platform 28 of the elevator 12 is moved so that a guide rail of the shuttle elevating platform 28 is in alignment with a guide rail on the fifth tier of the multi-tier racks 14L, 14R. After that, the transferring shuttle 10 with the load P placed thereon is moved onto the shuttle elevating platform 28 of the elevator 12, and then the shuttle elevating platform 28 is moved downward to the same height level as that of the retrieval conveyor 36. Since the shuttle elevating platform 28 and load elevating platforms 30L, 30R are adjacent to each other and moves upward and downward integrally, the load P on the transferring shuttle 10 can be transferred onto the right load elevating platform 30R by operating the handling mechanism 20 of the transferring shuttle 10 even during descent of the shuttle elevating platform 28. By this configuration, as soon as the load elevating platform 30R is aligned with the retrieval conveyor 36, the load P on the load elevating platform 30R can be retrieved to the retrieval conveyor 36.

When the right load elevating platform 30R is in alignment with the retrieval conveyor 36, the right load elevating platform 30L is in alignment with the storage conveyor 34. Accordingly, while the load P is being retrieved, the load P can be transferred from the storage conveyor 34 to the load elevating platform 30L. When retrieval of the load P and storage of the load P have been completed, the elevator 12 is driven to move the shuttle elevating platform 28 up, having the guide rail of the shuttle elevating platform 28 in alignment with the tenth guide rails of the multi-tier racks 14L, 14R. During this movement, the load P on the load elevating platform 30L can be taken by the handling mechanism 20 onto the transferring shuttle 10. Accordingly, once the shuttle elevating platform 28 reaches a predetermined height level, the transferring shuttle 10 can immediately move into the multi-tier rack and store the load P at a predetermined position on the shelf 16.

Since the load P can be transferred onto the transferring shuttle 10 during the movement of the transferring shuttle 10 in the above-mentioned way, the three operations can be performed in a series of process without time loss, thus improving the whole throughput capability of the automated storage/retrieval system.

The transferring shuttle 10 can move from a predetermined tier to another predetermined tier to directly transfer the load P without returning to storage and retrieval conveyors 34, 36. This operation can reduce the occupied time of the transferring shuttle in storage and retrieval, thus improving the efficiency of the transferring shuttle 10, which in turn can reduce the number of transferring shuttles. In this case, the load elevating platforms 30L, 30R only need to return to the level of the storage and retrieval conveyors 34, 36 at every interval of several cycles (=the number of loads that can be placed on the load elevating platforms), and discharge the retrieved load P and receive the load P to be stored. Accordingly, this mode is performed where the elevating platforms have sufficient capability and the transferring shuttle 10 do not have enough capability. In actual operation, these two modes are dynamically combined to realize optimal operation as a whole.

It should be easily understood by a person skilled in the art that where the load elevating platforms 30L, 30R and shuttle elevating platform 28 can move upward and downward independently as described above, any load can be handled in more various operation modes.

Second Embodiment

Next, a second embodiment of the present invention will be described.

Figure 3:
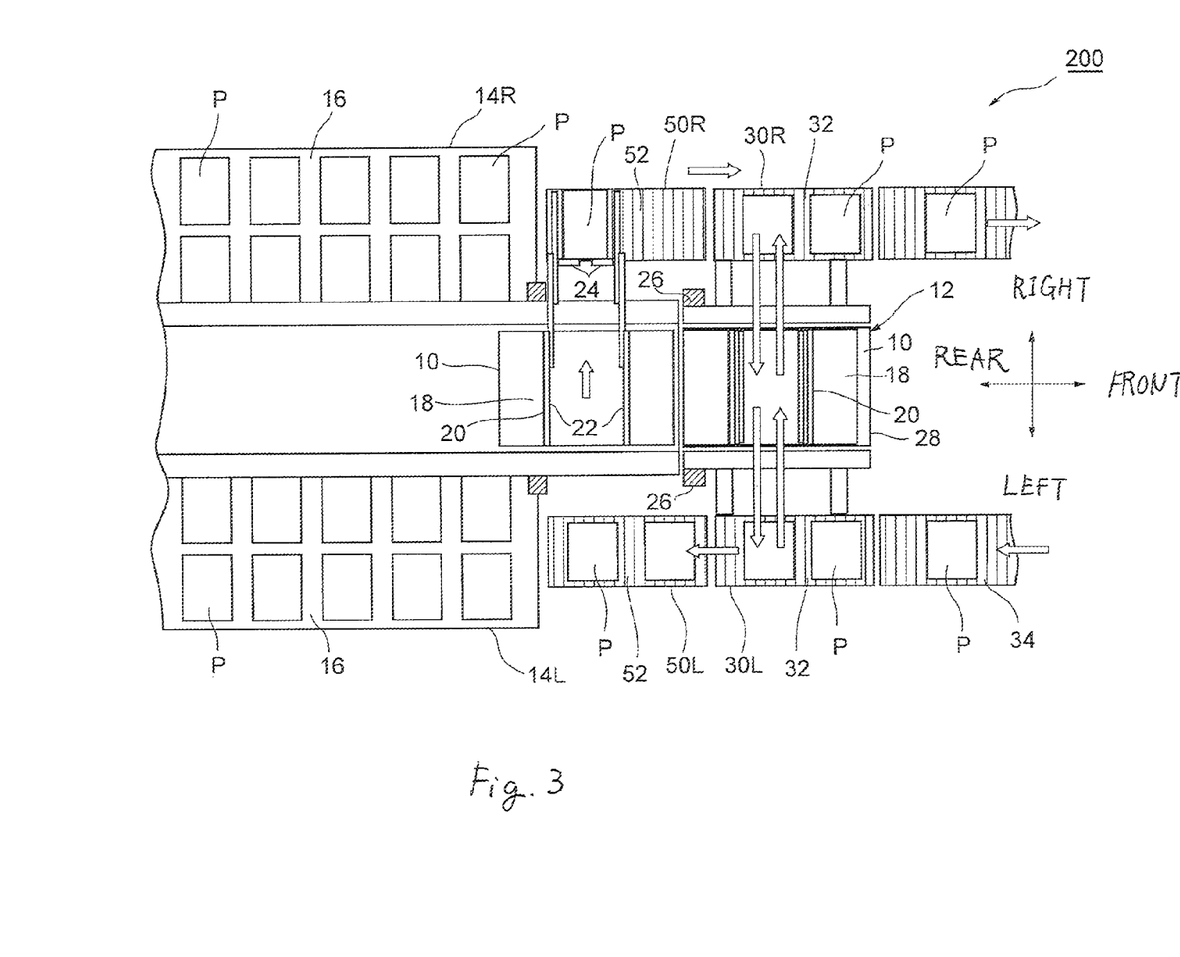
FIG. 3 is a schematic top plan view illustrating an automated storage/retrieval system according to a second embodiment of the present invention.
Figure 4:
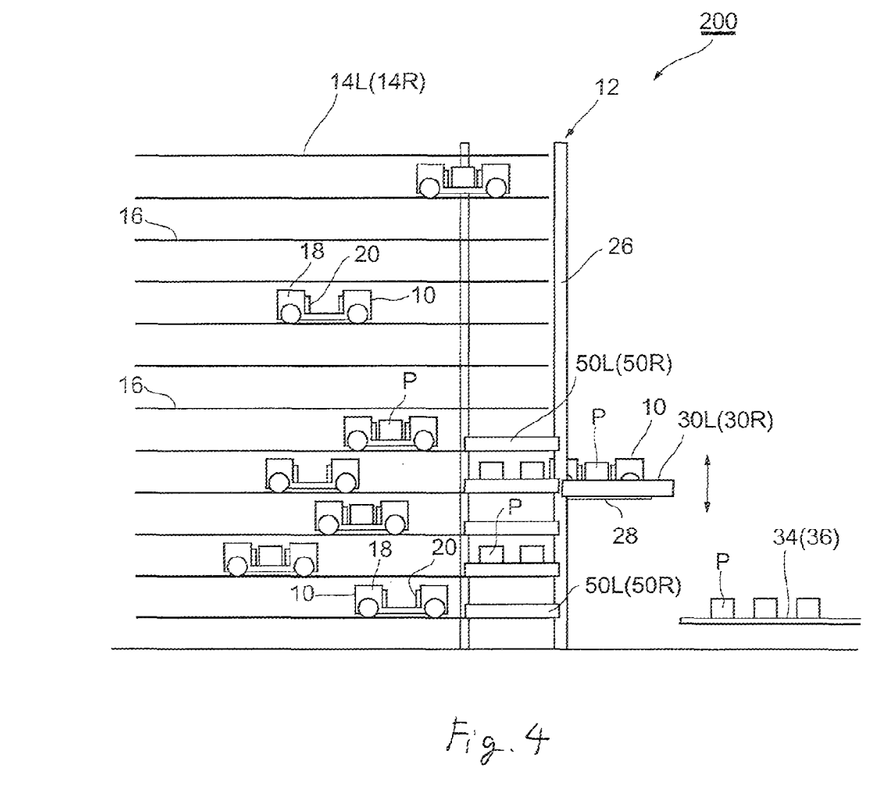
FIG. 4 is a schematic side elevation view of the automated storage/retrieval system in FIG. 3.

FIG. 3 is a schematic plane view illustrating an automated storage/retrieval system 200 according to the second embodiment, and FIG. 4 is a schematic side view thereof. This automated storage/retrieval system 200 basically has the same configuration as that of the automated storage/ retrieval system 100 according to the first embodiment. Accordingly, parts identical or corresponding to those of the automated storage/retrieval system 100 according to the first embodiment have the same reference numbers, and overlapped description will be omitted.

The automated storage/retrieval system 200 according to the second embodiment is different from the automated storage/retrieval system 100 according to the first embodiment in that the automated storage/retrieval system 200 includes waiting platforms 50L, 50R to have the load P wait at elevator 12-side ends of the left and right multi-tier racks 14L, 14R. The waiting platforms 50L, 50R may be provided at all tiers of the multi-tier racks 14L, 14R. Alternatively, as illustrated in FIG. 4, the multi-tier racks 14L, 14R may be divided into upper and lower parts, the waiting platforms 50L, 50R being provided at each tier in the lower part and no waiting platforms 50L, 50R being provided in the upper part, or vice versa. In the embodiment illustrated in FIG. 4, the upper part will correspond to the roaming-type automated storage/retrieval system according to the first embodiment, and the lower part will correspond to the captive-type automated storage/retrieval system in which a transferring shuttle 10 is provided at each tier. This design is intended to make part of the automated storage/retrieval system the roaming-type and to store slow moving loads to be stored or retrieved in this part, restraining increase of cost, and to make the remaining part thereof almost captive-type or completely captive-type and to store so-called fast moving loads to be stored or retrieved in this remaining part, thus maximizing throughput performance. Accordingly, this design is advantageous for a high-rise automated storage/retrieval system and/or an automated storage/retrieval system that stores loads whose storage and retrieval frequencies are various.

Since these waiting platforms 50L, 50R according to the second embodiment, each includes a conveyor 52, the load P can be delivered onto or received from the load elevating platforms 30L, 30R of the elevator 12. More specifically, in the lower part of the automated storage/retrieval system 200, the conveying direction of the conveyor 52 of the left waiting platform 50L is backward so that the conveyor 52 can receive the load P from the load elevating platform 30L to the left of the elevator 12, and the conveying direction of the conveyor 52 of the right waiting platform 50R is forward so that the conveyor 52 pushes the load P to the load elevating platform 30R to the right of the elevator 12. The waiting platforms 50L, 50R on each tier are positioned so as to face the transferring shuttle 10 at the tier, which enables the load P to be transferred between the transferring shuttle 10 and the waiting platforms 50L, 50R. Accordingly, in order to smoothly deliver the load P to or receive the load P from the transferring shuttle 10, the conveyors 52 of the waiting platforms 50L, 50R are preferably composed of roller conveyors.

In the illustrated second embodiment, each of the waiting platforms 50L, 50R is configured to be able to have two pieces of loads P placed thereon, but may also be configured to be able to have one piece of load P or more than two pieces of loads P placed thereon.

If the conveyors 32 of the load elevating platforms 30L, 30R can be driven in the opposite directions, it is preferable that the conveyors 52 of the waiting platforms 50L, 50R can be driven in the opposite directions.

In such a configuration, the lower part of the automated storage/retrieval system 200 is operated in the same way as or similar way to a conventional common captive-type automated storage/retrieval system. That is, the load elevating platform 30L, which is to the right of the elevator 12, with the load P from the storage conveyor 34 placed thereon moves to the height level of a predetermined right waiting platform 50R, and transfers the load P onto the waiting platform 50R. Then, the transferring shuttle 10 at the tier receives the load P from the waiting platform 50R and stores the load P onto a shelf 16. Meanwhile, the load P taken out from the shelf 16 waits on a left waiting platform 50L at the tier, moves to the right load elevating platform 30R of the elevator 12, and is transferred to the retrieval conveyor 36. During this, basically, the shuttle elevating platform 28 of the elevator 12 moves upward and downward empty except when the transferring shuttle 10 is moved.

As can be seen from arrows in FIG. 3, since a load can be moved rightward and leftward by the transferring shuttle 10, the load P waiting on the waiting platform 50L or 50R at a tier can be moved to the waiting platform 50L or 50R at another tier via a transferring shuttle 10 that is moved upward and downward by the elevator 12.

The upper part of the automated storage/retrieval system 200 is operated as with the above first embodiment.

The whole of the automated storage/retrieval system 200 may be configured to be the roaming-type and all tiers thereof may be provided with the waiting platforms 50L, 50R. In this case, even if the upper part of the automated storage/retrieval system 200 needs to be changed to the captive-type and the lower part needs to be changed to the roaming-type, the need can be dealt with by changing the instructions without a mechanical change, thus advantageously allowing for a dynamic change from the captive-type to the roaming-type or vice versa.

Returning to FIG. 1, each of portions indicated by a dashed-two dotted line in FIG. 1 is a frame 40 provided at a shelf 16 at each tier to fix an auxiliary equipment. The frame 40 can be used to increase the area of the shelf 16 by fixing the removable shelf board to the frame 40. To the frame 40 waiting platform 50L or 50R can be fixed but to be removable. This allows for easy design change from the roaming-type in FIGS. 1 and 2 to the captive-type in FIGS. 3 and 4, and also allows for easy design change to the hybrid type of the roaming-type and captive-type.

Third Embodiment

Figure 5:
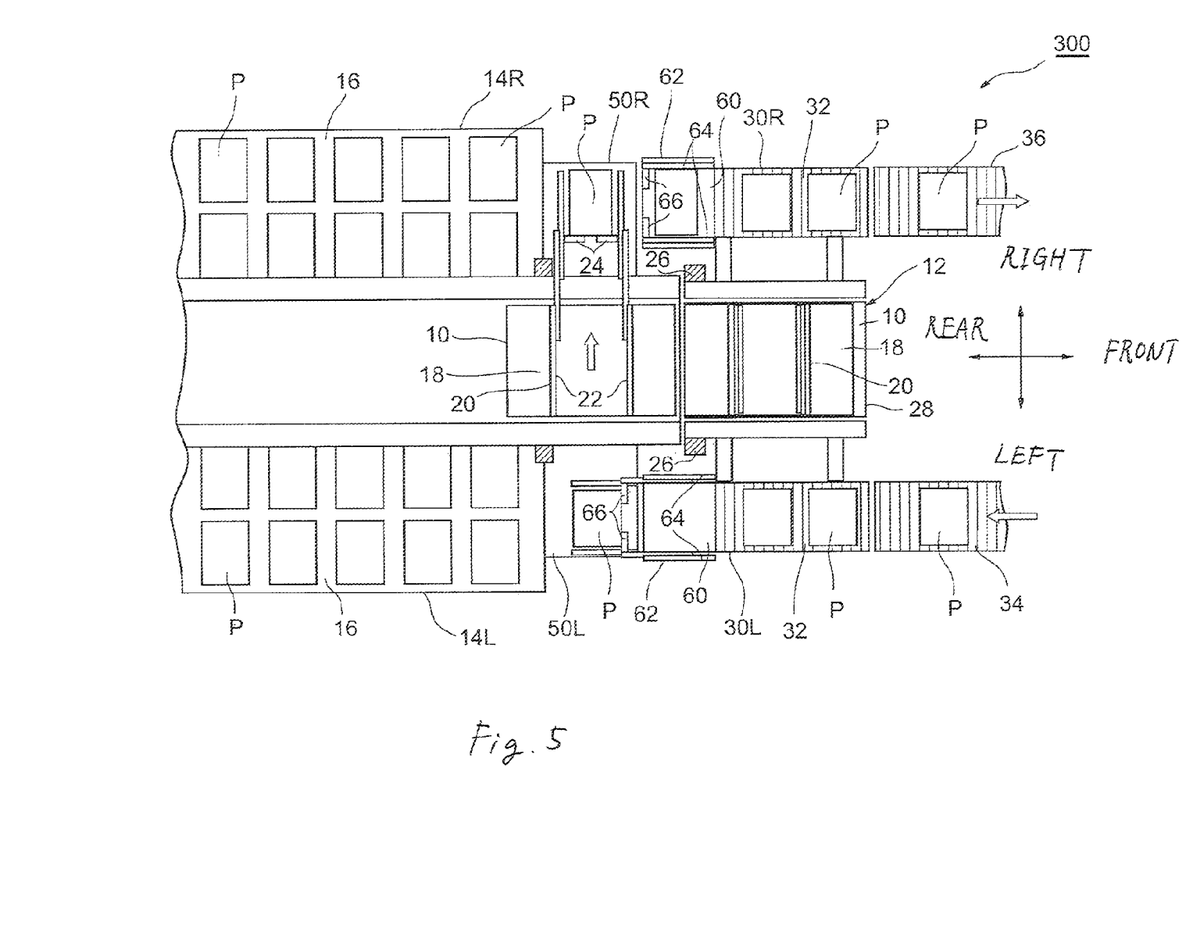
FIG. 5 is a schematic top plan view of an automated storage/retrieval system according to a third embodiment of the present invention.
Figure 6:
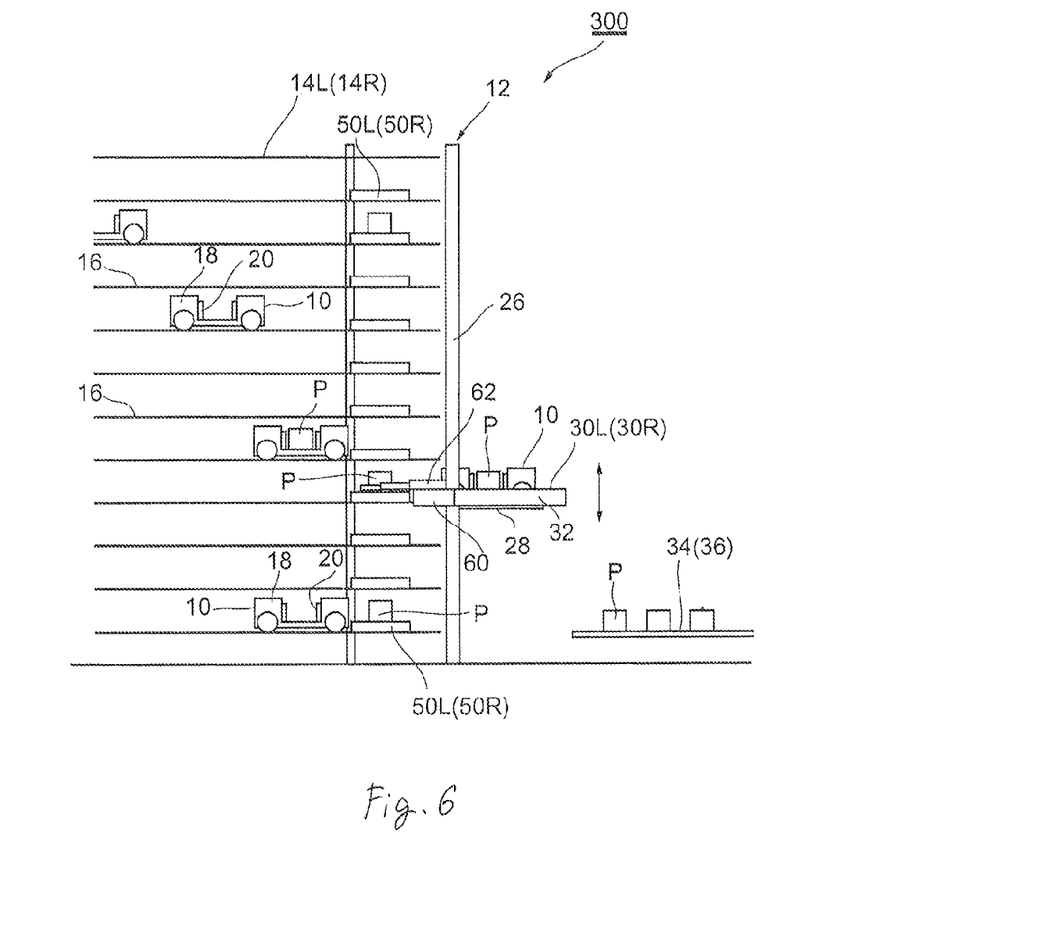
FIG. 6 is a schematic side elevation view of the automated storage/retrieval system in FIG. 5.

FIG. 5 and FIG. 6 are schematic plane and side views illustrating an automated storage/retrieval system 300 according to a third embodiment, respectively. This automated storage/retrieval system 300 is the same as the automated storage/retrieval system 100 according to the first embodiment in basic configuration, and is the same as the automated storage/retrieval system 200 according to the second embodiment in including the waiting platforms 50L, 50R. Accordingly, parts identical or corresponding to those of the automated storage/retrieval systems 100 and 200 according to the first and second embodiments have the same reference numbers and overlapped description will be omitted.

The automated storage/retrieval system 300 according to the illustrated third embodiment differs from that of the second embodiment in that all tiers of the multi-tier racks 14L, 14R are provided with the waiting platforms 50L, 50R. The waiting platforms 50L, 50R do not have conveyors, the upper surface of each of the waiting platforms 50L, 50R is a plane surface and has an area for only one piece of load P.

Each of the load elevating platforms 30L, 30R of the elevator 12 is composed of a section 32 on which two pieces of loads P can be placed and transferred thereon, and a section 60 that extends from the section 32 to the multi-tier rack 14L or 14R. The extended sections 60 are arranged adjacent to the waiting platform 50L, 50R at each tier by moving the load elevating platforms 30L, 30R upward or downward. Both of the sections 32 and 60 have conveyors and can have three pieces of loads in total placed and transferred thereon. In this Figure, three pieces of loads P in total can be arranged along a transferring direction, but the number of loads that can be placed may be one, two, or more than three.

Further, each of the extended sections 60 includes, as a means to transfer a load P to the waiting platforms 50L, 50R, a handling mechanism 62 similar to the handling mechanism 20 mounted in a transferring shuttle 10. That is, the handling mechanism 62 includes a pair of arms 64 that are extendable in the running direction of the transferring shuttle 10 and fingers 66 that can open and close and are fixed to each of the arms 64. By extending the arm 64 either forward or backward with the fingers 66 closed, the load P placed on the extended section 60 can be pushed out, enabling the load P to be transferred onto the waiting platform 50L, 50R or load elevating platform 30L, 30R adjacent to the extended section 60. By extending the arm 64 onto the waiting platforms 50L, 50R with the fingers 66 open, hooking a load P with the fingers 66 and retracting the arm 64 with the fingers 66 closed, the load P can be transferred onto the extended section 60 of the load elevating platform 30L or 30R.

In such a configuration, where the load P is placed on the waiting platform 50L or 50R, if the transferring shuttle 10 is disposed at the same tier of the waiting platform 50L or 50R and the transferring shuttle 10 does not need to move between tiers (for example, there is no order for another tier, or there is another load that can be retrieved in the same tier), the transferring shuttle 10 can be used to store the load P to the shelf 16 or to collect the load P from the shelf 16. That is, at all tiers, a captive-type automated storage/retrieval system operation can be performed.

The same roaming-type operation as that of the first embodiment can be operated without waiting platforms 50L, 50R. In the roaming-type operation, the waiting platforms 50L, 50R can be used in order to reduce the time of movement between tiers. In this case, the transferring shuttle 10 never transfers a load or performs only either storage or retrieval on the shuttle elevating platform 28.

In the third embodiment, loads P can be rearranged in the load elevating platforms 30L, 30R. That is, by adjusting the method to retrieve the load P between the transferring shuttle 10 on the shuttle elevating platform 28 of the elevator 12, the sections 32 and 60 of the load elevating platforms 30L, 30R, and the waiting platforms 50L, 50R, the sequence of loads P arranged on the sections 32 and 60 of the load elevating platforms 30L, 30R can be changed from the order of storage and retrieval. This rearrangement of loads P before retrieval leads to easier handling of loads P after retrieval. Since the sequence of storage and retrieval on the load elevating platforms does not necessarily have to correspond to the order of storage and retrieval of transferring shuttles 10, waiting time of transferring shuttles 10 is reduced, that is, the utilization of transferring shuttles 10 is improved, which in turn improves the throughput performance of the automated storage/retrieval system and reduces the number of transferring shuttles, that is, contributes to cost reduction.

In the third embodiment, like the second embodiment, a frame 40 for fixing an auxiliary equipment illustrated in FIG. 1 can be used to fix the waiting platform 50R or 50L to a shelf 16. This allows for easy design change from the configuration illustrated in FIGS. 1 and 2 to the configuration illustrated in FIGS. 5 and 6.

Preferred embodiments of the present invention have been described in detail, but it should be appreciated that the present invention is not limited to the above embodiments, and various changes and modifications can be made without departing from the spirit and scope of the present invention. For example, in the above embodiments, one storage conveyor and one retrieval conveyor are provided, but storage conveyors and retrieval conveyors arranged one above the other may be provided at each of the right and left tiers, or an independent elevating platform may be configured in two tiers.

What is claimed is:

1. An automated storage/retrieval system comprising:
    a first multi-tier rack and a second multi-tier rack, each having shelves that are arranged in a parallel position to each other;
    a transferring shuttle that can run in a horizontal direction along said shelves of a selected tier between the first multi-tier rack and the second multi-tier rack to store a load (P) onto or retrieve a load (P) from one of said shelves; and
    an elevator to move the transferring shuttle (10) to another tier;
    wherein the elevator includes a shuttle elevating platform that is adapted to move upward and downward with the transferring shuttle placed thereon, the shuttle elevating platform being able to move upward and downward adjacent to the first multi-tier rack and the second multi-tier rack, and a first load elevating platform and a second load elevating platform adapted to move upward and downward with a load (P) placed thereon, respectively, the first load elevating platform and second load elevating platform being able to move upward and downward together with the shuttle elevating platform while being in a horizontal alignment with the shuttle elevating platform;
    a storage conveyor and a retrieval conveyor extending from a conveying system outside of the automated storage/retrieval system, said storage conveyor adapted to place a load onto one of the load elevating platforms when that load elevating platform is at a height level of the storage conveyor, said retrieval conveyor adapted to receive a load from the other of the load elevating platforms when that load elevating platform is at a height level of the retrieval conveyor;
    wherein when the shuttle elevating platform is in alignment with the first load elevating platform, the transferring shuttle on the shuttle elevating platform can deliver a load (P) to or receive a load (P) from the first load elevating platform; and
    wherein when the shuttle elevating platform is in alignment with the second load elevating platform, the transferring shuttle on the shuttle elevating platform can deliver a load (P) to or receive a load (P) from the second load elevating platform wherein at least some of the tiers of the first multi-tier rack and the second multi-tier rack each have waiting platforms that are directly accessible by the shuttle and adapted to temporarily receive a load (P) thereon, thereby enabling the load (P) to be delivered to or received from one of the first load elevating platform and second load elevating platform, wherein the first load elevating platform and second load elevating platform each comprises a handling mechanism that can push a load (P) onto one of the waiting platforms or can pull a load (P) from one of the waiting platforms.

2. The automated storage/retrieval system according to claim 1, wherein the first load elevating platform and the second load elevating platform are adapted to move upward and downward integrally with the shuttle elevating platform while being in alignment with the shuttle elevating platform.

3. The automated storage/retrieval system according to claim 2, wherein the first load elevating platform and the second load elevating platform each comprises a conveyor that can convey a load (P) placed thereon.

4. The automated storage/retrieval system according to claim 3, wherein each of the waiting platforms comprises a conveyor that can convey a load (P) placed thereon.

5. The automated storage/retrieval system according to claim 1, wherein the shuttle elevating platform, the first load elevating platform and the second load elevating platform are adapted to move upward and downward independently from one another.

6. The automated storage/retrieval system according to claim 5, wherein the first load elevating platform and the second load elevating platform, each comprises a conveyor that can convey a load (P) placed thereon.

7. The automated storage/retrieval system according to claim 6, wherein each of the waiting platforms comprises a conveyor that can convey a load (P) placed thereon.

8. The automated storage/retrieval system according to claim 1, wherein the first load elevating platform and the second load elevating platform each comprises a conveyor that can convey a load (P) placed thereon.

9. The automated storage/retrieval system according to claim 1, wherein each of the waiting platforms comprises a conveyor that can convey a load (P) placed thereon.

10. The automated storage/retrieval system according to claim 1, wherein the waiting platforms are removeably supported.

* * * * *

UNITED STATES PATENT AND TRADEMARK OFFICE
CERTIFICATE OF CORRECTION

PATENT NO. : 9,630,777 B2
APPLICATION NO. : 14/124732
DATED : April 25, 2017
INVENTOR(S) : Shin Yamashita It is certified that error appears in the above-identified patent and that said Letters Patent is hereby corrected as shown below:

On the Title Page

Item (73), Assignee name "Dematic Systems GmbH" should be --Dematic GmbH--

Signed and Sealed this
First Day of October, 2019

Andrei Iancu
*Director of the United States Patent and Trademark Office*